May 22, 1928.
J. HALBROOKS
RIM EXPANDER
Filed Oct. 22, 1927
2 Sheets-Sheet 1
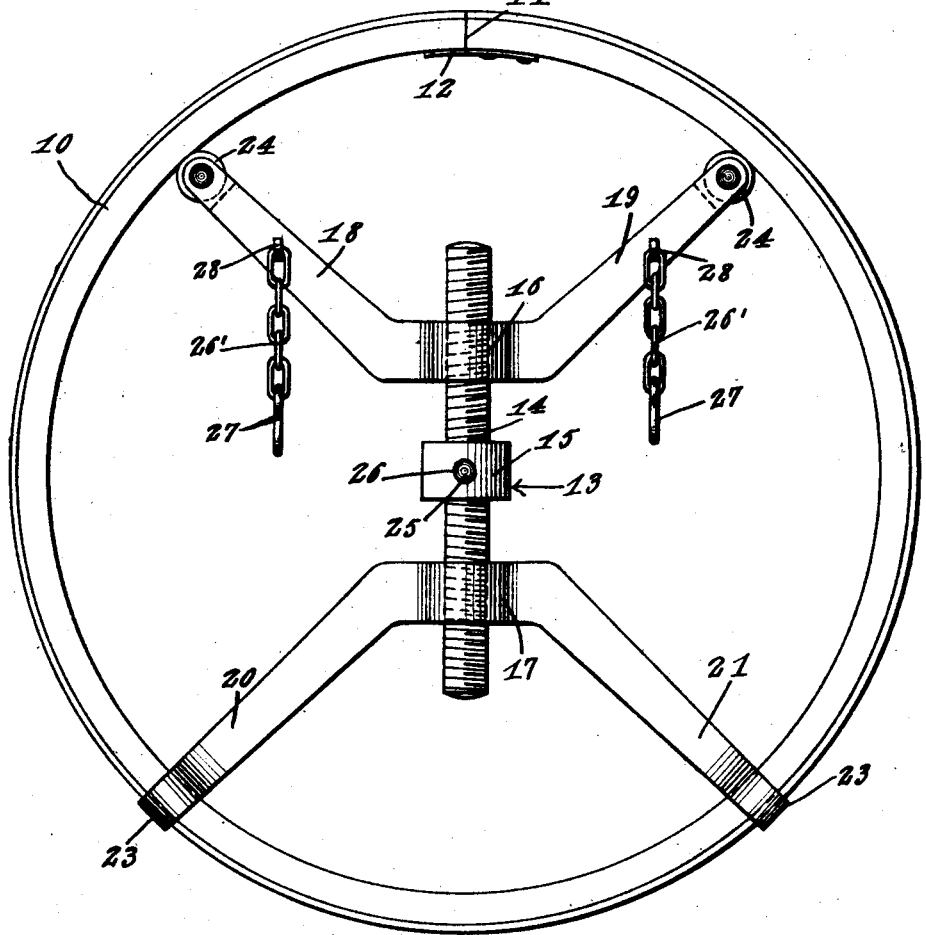
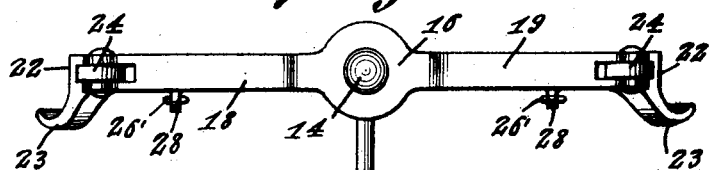
James Halbrooks, INVENTOR
BY Victor J. Evans
ATTORNEY May 22, 1928.

J. HALBROOKS

RIM EXPANDER

Filed Oct. 22, 1927

James Halbrooks, INVENTOR

BY Victor J. Evans

ATTORNEY

Patented May 22, 1928.

1,670,961

UNITED STATES PATENT OFFICE.

JAMES HALBROOKS, OF CORPUS CHRISTI, TEXAS.

RIM EXPANDER.

Application filed October 22, 1927. Serial No. 228,003.

The present invention relates to rim expanders and has for an important object to provide an expander for rims which may also be used to contract said rims.

Other objects are simplicity of construction, cheapness of manufacture, strength, ease of operation, and ease of mounting the same on a rim for operating thereupon.

Other objects of the invention are to facilitate the mounting of a rim on a felly and the mounting of a tire on the rim.

Other objects and advantages will appear from the following specification and will be set forth in the appended claims, and I do not wish to be limited in the scope of my invention except as I shall be limited by said claims.

In the drawings:

Figure 1 is an elevation of a rim with my invention applied thereto for expanding the same.

Figure 2 is an end elevation of the device, showing shouldered hook members adapted to be hooked over the rim and rollers adapted to ride along the inner surface thereof.

Figure 3 is a detail of a hook used in contracting the rim.

In the mounting of rims on the felly of an automobile, or in mounting a tire on said rim, great difficulty is experienced in assembling these members, owing to the tightness of fit therebetween, and it was with this in mind that I have constructed my device.

Figure 4:
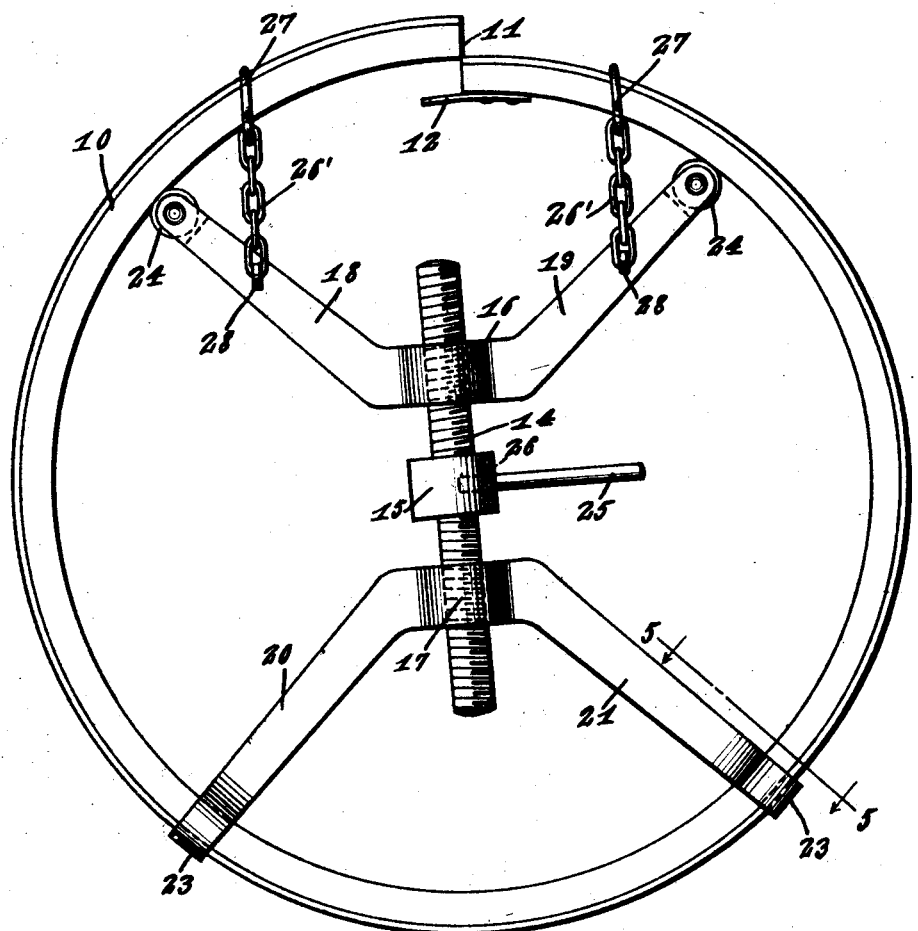
Figure 4 is a view similar to Figure 1, but showing the device as applied for contracting a rim.

Referring to the drawings in detail by reference numerals, the same numerals designating the same parts in all figures of the drawings, 10 designates a rim which, as shown, is such as is used to hold a tire to the felly of a wheel. The present rim is shown as being split at 11 and being provided with an extending tongue 12 on its inner periphery, which overlaps the other end of the rim, forming a lapped joint. 13 designates a form of my invention and is shown in Figures 1 and 4 as applied to the rim 10, in Figure 1 in position for expanding the same and in Figure 4 for contracting the rim.

Figure 5:
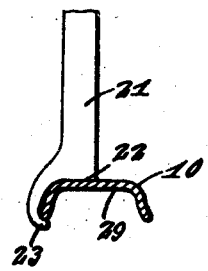
Figure 5 is a detail fragmentary view of one arm of the expander device, showing the relation thereof to a rim when mounted thereon, the rim being shown in section on the line 5—5 of Figure 4.

14 designates a bar having a shouldered member 15 secured centrally thereof and being reversely threaded from its opposite ends to said shouldered member. Cooperating with said bar are nuts 16 and 17 having threaded bores cooperating with the threads of said bar for longitudinal movement relative thereto. These ends are provided with oppositely disposed arms 18, 19, 20 and 21, the first two arms extending from the nut 16 and the latter two from the nut 17, the pairs of arms on each nut extending outwardly therefrom and at an angle of approximately 90° to each other, although it is to be understood that the precise angle may be changed without departing from the spirit of the invention. The arms 20 and 21 are provided with shoulders 22 adapted to fit against the inner periphery of the rim, as shown in Figure 5, and extending downwardly from said shoulders are hooked members 23 adapted to take over the edge of the rim to prevent slipping of the shoulders from the rim. The opposite arms 18 and 19 are provided with rollers 24 adapted to bear against the inner surface of the rim and to ride thereupon.

In the operation of the device for expanding a rim a pin, as at 25, is inserted in an aperture 26 in the central shouldered member 15 and with this leverage a turning action may be had on the threaded rod, thereby moving the pairs of arms 18 and 19, and 20 and 21 simultaneously outwardly, expanding the rim and adapting it to be slipped with ease upon a felly. After the rim has been slid about half way onto the felly, the expanding mechanism may be simply and quickly removed and the rim forced the rest of the way in the usual manner.

In contracting the rim for placing it within the inner periphery of a tire, chains 26′ are provided having hooks 27 at one end thereof, the opposite end being connected with the arms 18 and 19 respectively by means of apertured ears 28 formed thereon or attached thereto, as may be found convenient, and in contracting the rim the action is the opposite of that described in expanding the same, or, in other words, the rod 14 is turned in the opposite direction, drawing the pairs of arms 18 and 19, and 20 and 21 toward each other, whereupon a pulling action will be exerted between the hooked ends 23 of the arms 20 and 21 connected to one side of the rim and the hooks 27 secured over the diametrically opposite side of the rim. The rim, as shown in Figure 4, will be drawn inwardly by this action, whereupon a tire can be placed within the trough 29 of the rim and the rim can then be allowed to spring back in position or may be moved outwardly, as in the case of mounting the rim on a felly. The hooked members 23, it should be noted, are just long enough to hook over one edge of the rim and will not interfere with the placing of a tire thereon.

Having described my invention, what I claim is:

1. In a device of the character described, a bar oppositely threaded from its ends, nuts threadedly engaged with respective ends, arms extending from said nuts, shouldered members on the free ends of the arms of one nut and adapted to rest against the inner periphery of the rim, rim engaging rollers on the ends of the arms of the other nut, flexible hook carrying members secured to the last mentioned arms, and hooks on said members.

2. In a device of the character described, a bar oppositely threaded at its ends, pairs of connected arms threadedly connected with the ends of the rods, hook members formed with one of said pairs of arms and adapted to grapple the edge of a rim, shoulders formed on the last mentioned pairs of arms to bear against the inner periphery of the rim, rollers carried by the other pair of arms and adapted to bear against the inner periphery of the rim, flexible members connected with the last mentioned arms, hooks on the flexible members and adapted to grapple with the edge of the rim, and means for rotating said bar.

In testimony whereof, I affix my signature.

JIM HALBROOKS.